United States Patent [19]

Eng et al.

[11] Patent Number: 5,093,743
[45] Date of Patent: Mar. 3, 1992

[54] OPTICAL PACKET SWITCH

[75] Inventors: Kai Y. Eng, Eatontown; Mark J. Karol, Fair Haven; Mario A. Santoro, Shrewsbury, all of N.J.

[73] Assignee: AT&T Bell Laboratories, Murray Hill, N.J.

[21] Appl. No.: 635,073

[22] Filed: Dec. 28, 1990

[51] Int. Cl.⁵ .......................................... H04B 12/00
[52] U.S. Cl. .................................. 359/120; 359/121; 359/117; 359/133
[58] Field of Search ............... 370/3, 4; 455/612, 617, 455/606, 607; 359/121, 117, 133, 120

[56] References Cited

U.S. PATENT DOCUMENTS

| | | | |
|---|---|---|---|
| 4,710,914 | 12/1987 | Robieux | 370/3 |
| 4,726,644 | 2/1988 | Mathis | 370/3 |
| 4,797,879 | 1/1989 | Habbab | 370/3 |
| 4,873,681 | 10/1989 | Arthurs et al. | 370/4 |
| 4,955,016 | 9/1990 | Eng et al. | 370/60 |
| 4,955,017 | 9/1990 | Eng et al. | 370/60 |

OTHER PUBLICATIONS

"Hypass: An Optoelectronic Hybrid Packet Switching System", IEEE Journal on Selected Areas in Communications, vol. 6, No. 9, Dec. 1988 by E. Arthurs et al.
"Frequency-Division-Multiplex Coherent Optical Switch Experiment with Monolithic Tunable Lasers Covering a 1000-GHz Range", Proceedings of the OSA Topical Meeting on Photonic Switching, Mar. 1-3, 1989, Salt Lake City, Utah, Copyright 1989 Optical Society of America (Author of article K. Y. Eng et al.).
"A Broadband Optical Multicast Switch", by E. Arthurs et al., Proceedings of VIII International Switching Symposium held in Stockholm Sweden on May 27-Jun. 1, 1990, Poster session, Paper #2, vol. III, p. 7.

Primary Examiner—Edward L. Coles, Sr.
Assistant Examiner—L. Pascal
Attorney, Agent, or Firm—Thomas Stafford

[57] ABSTRACT

An interconnect fabric is constructed from a plurality of fixed wavelength transmitters which are used to transmit arriving data packets through a star coupler, and a plurality of tunable receivers which tune to whatever frequency necessary to receive the desired data from the star coupler. A control network, constructed from a plurality of fixed wavelength receivers and a plurality of tunable transmitters, determines what frequencies the tunable receivers should tune to, and sends a signal to effectuate such tuning.

4 Claims, 4 Drawing Sheets

1

OPTICAL PACKET SWITCH

TECHNICAL FIELD

This invention relates generally to the field of packet switching, and more particularly, to an improved optical packet switch.

DESCRIPTION OF THE PRIOR ART

Recently, it has been proposed to construct growable packet switches from a relatively large memoryless interconnect fabric and a plurality of smaller packet switching modules. See for example, U.S. Pat. Nos. 4,955,016 and 4,955,017, issued to Eng et al., both of which are incorporated herein by reference. A high level block diagram of such an arrangement is shown in FIG. 1.

In the Eng arrangement, a memoryless interconnect fabric 101 reads the address in each arriving data packet and maps that address to a particular group of interconnect fabric outputs, where each group of interconnect fabric outputs are coupled to the inputs of a separate one of relatively small packet switches 102-104. Simultaneously arriving data packets comprising the same address are not mapped to the same interconnect fabric output, but rather, are mapped to the same group of interconnect fabric outputs and are each then transmitted to a different interconnect fabric output for conveyance to a packet switch. If the number of simultaneously arriving data packets with the same address is no greater than the group size, all packets are transmitted to a separate interconnect fabric output and are thereby routed through the appropriate one of packet switches 102-104 to the proper output 111-116. However, if the number of simultaneously arriving packets with the same address is greater than the group size, excess packets are simply discarded or if necessary, stored until a later time slot. By correctly adjusting the group size, the probability of lost packets can be made extremely small. The entire arrangement, including the interconnect fabric 101 and the plurality of small packet switches 102-104, functions as one large packet switch. The details of how to select the group size as a function of a particular system's requirements are set forth in the previously incorporated United States patents.

The Eng arrangement of FIG. 1 provides a technique whereby a packet switch may be grown as large as an expanding network may require by simply adding more groups of outputs to the interconnect fabric, and then connecting a relatively small packet switch to each of the new groups of outputs. The drawback with the arrangement is that it requires a rather complex scheduling algorithm to route the packets through the interconnect fabric to the output packet switches. Due to the advantages that the Eng arrangement provides, it is desirable to provide a simple and easily implementable technique for routing the packets through the interconnect fabric so that the entire arrangement of FIG. 1 can be advantageously utilized.

SUMMARY OF THE INVENTION

The above problem is overcome and a technical advance achieved in accordance with the present invention which relates to a novel interconnect fabric constructed from both a tunable receiver/fixed transmitter network and a tunable transmitter/fixed receiver network. Each of a plurality of incoming data streams is used to modulate a fixed frequency transmitter, where each fixed frequency transmitter transmits data on a separate frequency. The outputs of the fixed frequency transmitters are all combined by a star coupler. Each of the groups of interconnect fabric outputs is equipped with a plurality of tunable receivers, where each tunable receiver is connected to a separate output of the star coupler. Depending upon which frequency each tunable receiver tunes to, it will receive packets from a particular fixed frequency transmitter. Receivers at each interconnect output group can be tuned to select a predetermined number of the input packets for transmission out of the interconnect fabric. Thus, after mapping the address in each arriving packet to a group of interconnect outputs, the packets are each transmitted to a separate output of the group by simply tuning the tunable receivers at the output group accordingly.

The determination of which tunable receivers should be tuned to which frequencies is done by transmitting requests from each transmitter to a control network. The control network includes means for receiving the requests and for causing the tunable receivers in each group of outputs to retune in order to receive one or more packets destined for that group. If the number of packets arriving during a time slot is greater than the number of outputs in the group, the excess packets are either discarded or stored until a subsequent time slot.

In one embodiment, the control network is implemented with a tunable transmitter/fixed receiver star coupler network. Specifically, the control network includes a plurality of fixed receivers, each at a different wavelength and associated with a separate group of outputs of the interconnect fabric, a plurality of tunable transmitters, one associated with each input to the interconnect fabric, and a star coupler therebetween. In operation, the tunable transmitters each read the packet header from the incoming packet of their associated interconnect input, determine which group of interconnect fabric outputs to route the packet to, and then tune to the frequency of the fixed receiver associated with that group of outputs. The fixed receiver then selects a predetermined number of packets, no greater than the group size, to transmit to that group of interconnect outputs and causes the tunable receivers in that group of interconnect outputs to tune to the proper frequencies for receiving the selected packets from the fixed frequency transmitters.

DETAILED DESCRIPTION

Figure 1:
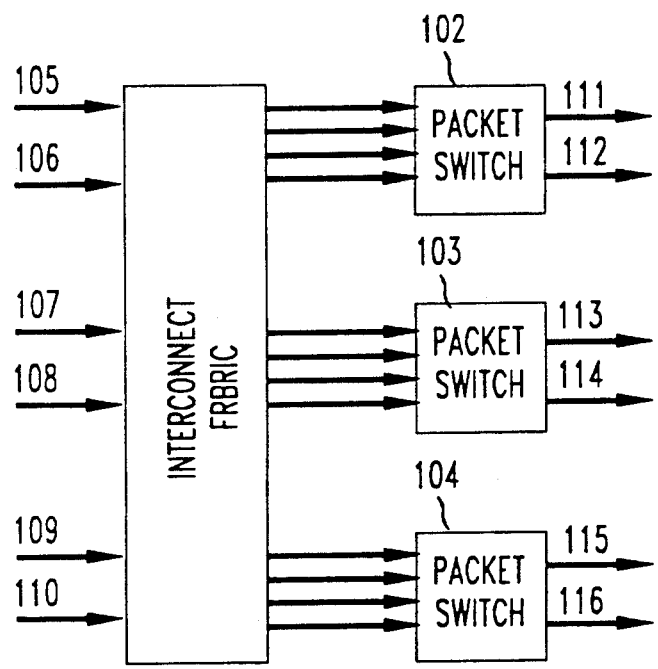
FIG. 1 shows, in simplified block form, a prior art growable packet switch architecture.

FIG. 1 shows a high level block diagram of a growable packet switch architecture. In operation, a plurality of packets arrive concurrently, during predetermined time slots, on inputs 105-110 of interconnect fabric 101. Interconnect fabric 101 then examines the address in each packet header and routes up to four packets to each of output packet switches 102-104. If more than four packets are destined for the same output packet switch, the excess packets are simply dropped, the probability of such an occurrence being acceptably small. In order that the growable switch architecture operate properly, there must be a technique employed by interconnect fabric 101 to examine the address in the arriving packets and determine which packets should be routed to the interconnect outputs, and which packets, if any, should be dropped.

Figure 2:
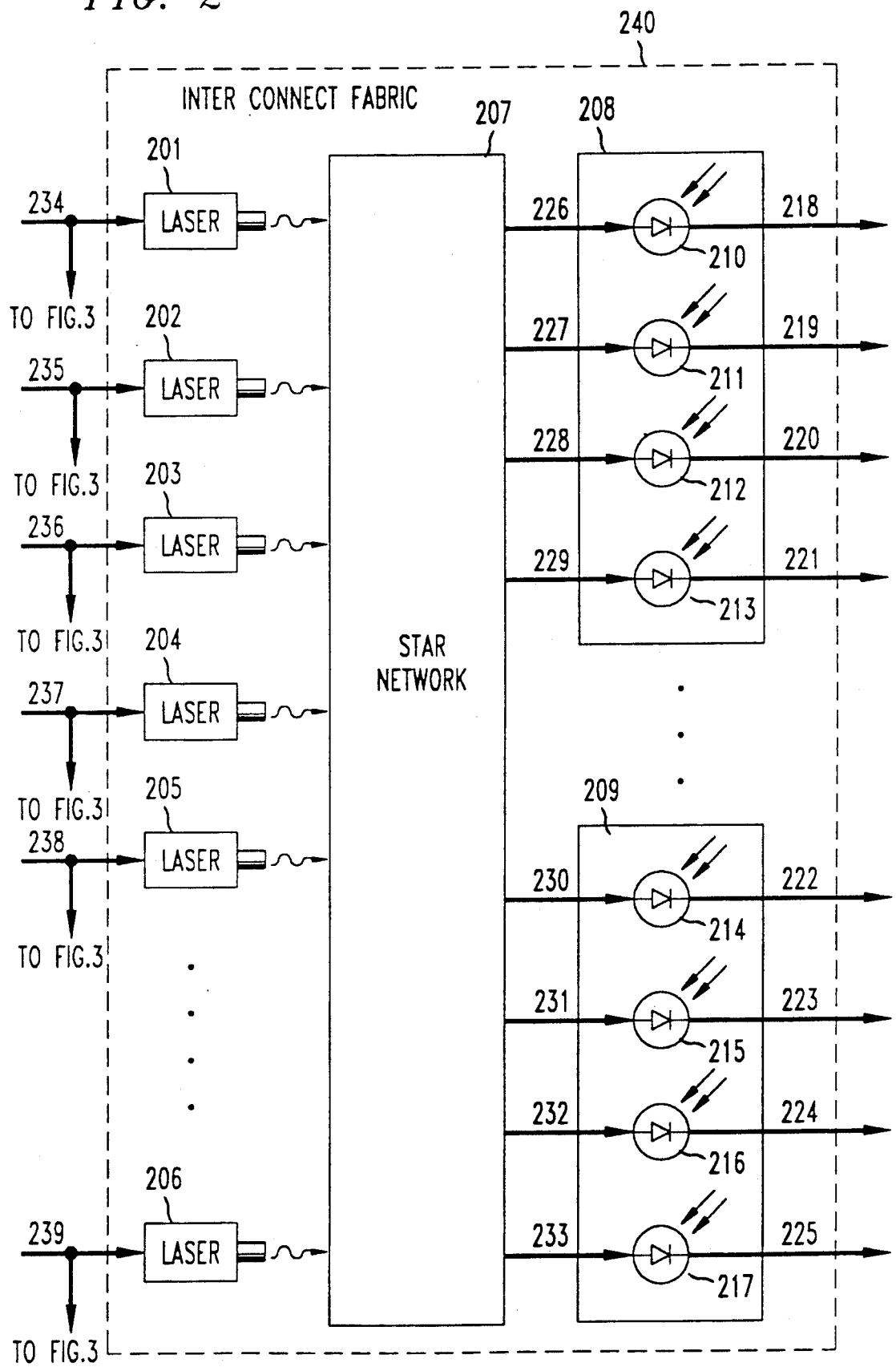
FIG. 2 depicts, in simplified form, an interconnect fabric employed in one embodiment of the invention.

FIG. 2 shows a conceptual block diagram of an interconnect fabric that may be employed in the growable switch architecture of FIG. 1. The interconnect fabric 240 is intended to be used in a 64 × 64 packet switch, and is, therefore, shown with more inputs and outputs than interconnect fabric 101 of FIG. 1. Exemplary interconnect fabric 240 is an optical implementation of the invention, however, it should be understood that the invention is not limited to such an implementation and that it may be built using any type of transmitters and receivers.

The interconnect outputs 218–225 are divided into an exemplary eight groups of twenty six exemplary receivers each. The tunable optical receivers are in each group are labelled 210–213 and 214–217, respectively and only four of the twenty six are shown for purposes of clarity.

In operation, a plurality of data packets arrive concurrently, in predetermined time slots, on inputs 234–239 and are each used to modulate a separate one of lasers 201–206 as shown in FIG. 2. Each of lasers 201–206 is arranged to transmit the incoming data on a separate optical wavelength to star network 207, where all of the optical signals are combined and distributed. Thus, each of star coupler outputs 226–233 contains the same Wavelength Division Multiplexed (WDM) signal; i.e., the sum of all of the signals transmitted from lasers 201–206.

It can be appreciated from the above that each of tunable receivers 210–213 and 214–217 can receive any of the packets that arrived in a particular time slot by simply tuning to the proper frequency. Thus, up to twenty six concurrently arriving packets may be received by group 208 by simply tuning the twenty six tunable receivers 210–213 to the proper 26 wavelengths; i.e., the wavelengths transmitted by the twenty six lasers 201–206 on which the desired twenty six packets arrived. Thus, in each time slot, the packets arrive at the 64 inputs 234–239, are modulated each at a different frequency for transmission through the star network 207, and each group of tunable receivers up to twenty six of such packets by tuning to the proper frequency.

The one remaining problem for interconnect fabric 240 is the control of the returning. Specifically, it should be appreciated from the above that in each time slot, each group of retunable optical receivers must retune in order to receive the packets that are destined for that particular group in that particular time slot. The addresses included in the incoming packets determine which group of outputs each packet is destined for and, thus, there exists the need for a technique to read the incoming addresses from the arriving packets in each time slot and, based thereon, cause the tunable receivers to retune to the proper frequencies so that each group of outputs will receive all packets destained for it up to a maximum of twenty six. An exemplary implementation of a solution to this control problem is described below.

Figure 3:
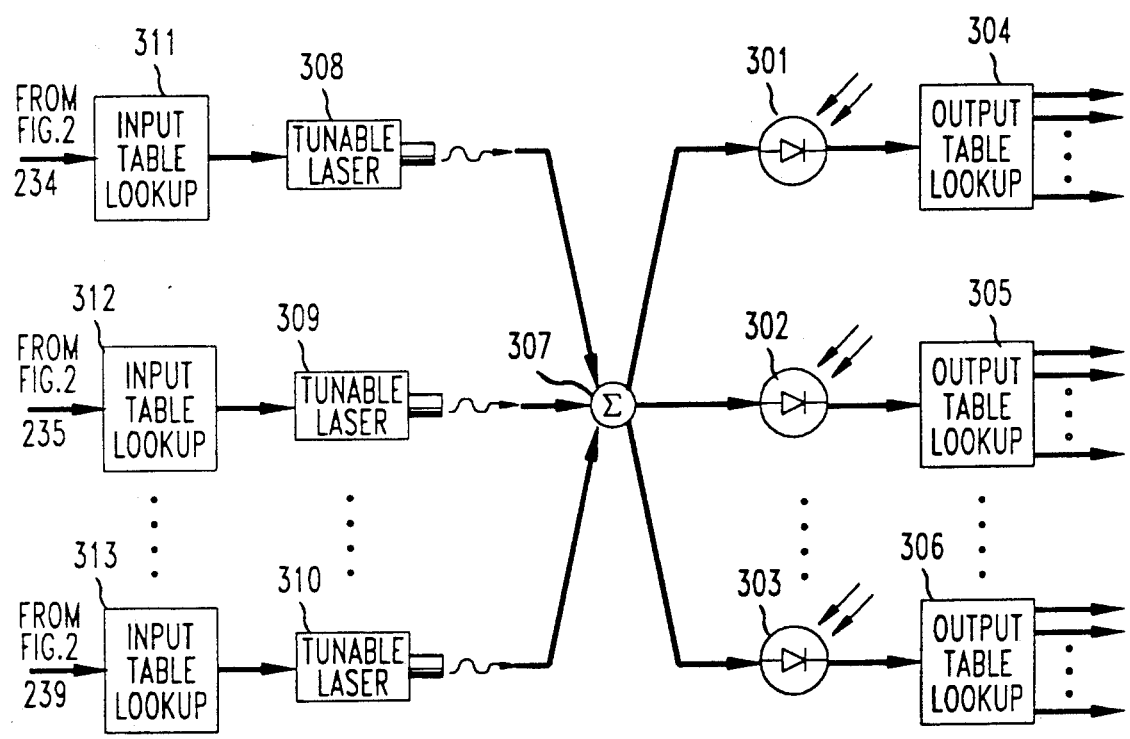
FIG. 3 shows, in simplified form, details of a control network employed in one embodiment of the invention.

FIG. 3 shows a conceptual block diagram of a control network which can be used to tune all of the tunable receivers 210–217. The arrangement of FIG. 3 includes a plurality of table lookup means 311–313 and 304–306, a plurality of tunable lasers 308–310, an optical star coupler 307, and a plurality of fixed wavelength receivers 301–303. It should be noted that for purposes of clarity, all of the components required to implement the control network for the interconnect fabric 240 are not shown. Specifically, there would actually be eight fixed wavelength optical receivers, one corresponding to each group of outputs, and eight table lookup means 304–306, one for each group of outputs. Moreover, there would actually be sixty four input table lookup means 311–313, and sixty four tunable lasers 308–310, one for each input of the interconnect fabric. In general, the preferred technique for practicing the invention is to make the number of interconnect inputs match the number of input table lookup means and the number of fixed wavelength optical receivers match the number of groups of outputs.

In operation, packets that arrive concurrently at inputs 234–239 include an address field which is routed to input table lookup means 311–313. Each input table lookup means 311–313 is associated with a separate input 234–239, and the address in the data packet arriving on that input is routed to the associated input table lookup means. Each input table lookup means then determines which output group the arriving packet is destined for. After making this determination, each input table lookup means then determines which fixed optical receiver corresponds to that group of interconnect outputs, and what the fixed wavelength of that fixed optical receiver is. Moreover, each input table lookup means will then send a signal to its associated one of tunable lasers 308–310 and cause the tunable laser to tune to the frequency of the fixed receiver associated with the fixed wavelength receiver of the desired output group.

From the above it can be appreciated that in each predetermined time slot during which packets arrive, each tunable laser will transmit a message to the fixed wavelength optical receiver associated with the group of outputs for which the packets are destined. Conversely, each of fixed wavelength optical receivers will receive a plurality of requests from the various tunable lasers. The fixed wavelength optical receivers 301–303 then transmit the request to the table lookup means 304–306. Each of table lookup means 304–306 then selects a maximum of twenty six requests to accept, while discarding/ignoring the remaining requests if any. Finally, the table lookup means 304–306 each send signals on their respective outputs to their associated tunable receivers 210–217 in order to instruct the tunable receivers what frequencies to tune to.

One other implementation detail must be resolved. Specifically, it is highly likely that several of the inputs 235–239 of FIG. 2 will receive packets destined for the same group of outputs. Consequently, several of the tunable lasers of FIG. 3 will transmit on the same wavelength during the same time slot, resulting in collisions at star coupler 307 of FIG. 3. The basic problem, therefore, is to provide a technique of conveying several information signals at the same wavelength through star coupler 307. This apparent problem, however, can be overcome via time division multiplexing (TDM), subcarrier multiplexing, or through a variety of other means which are well known in the art.

Figure 4:
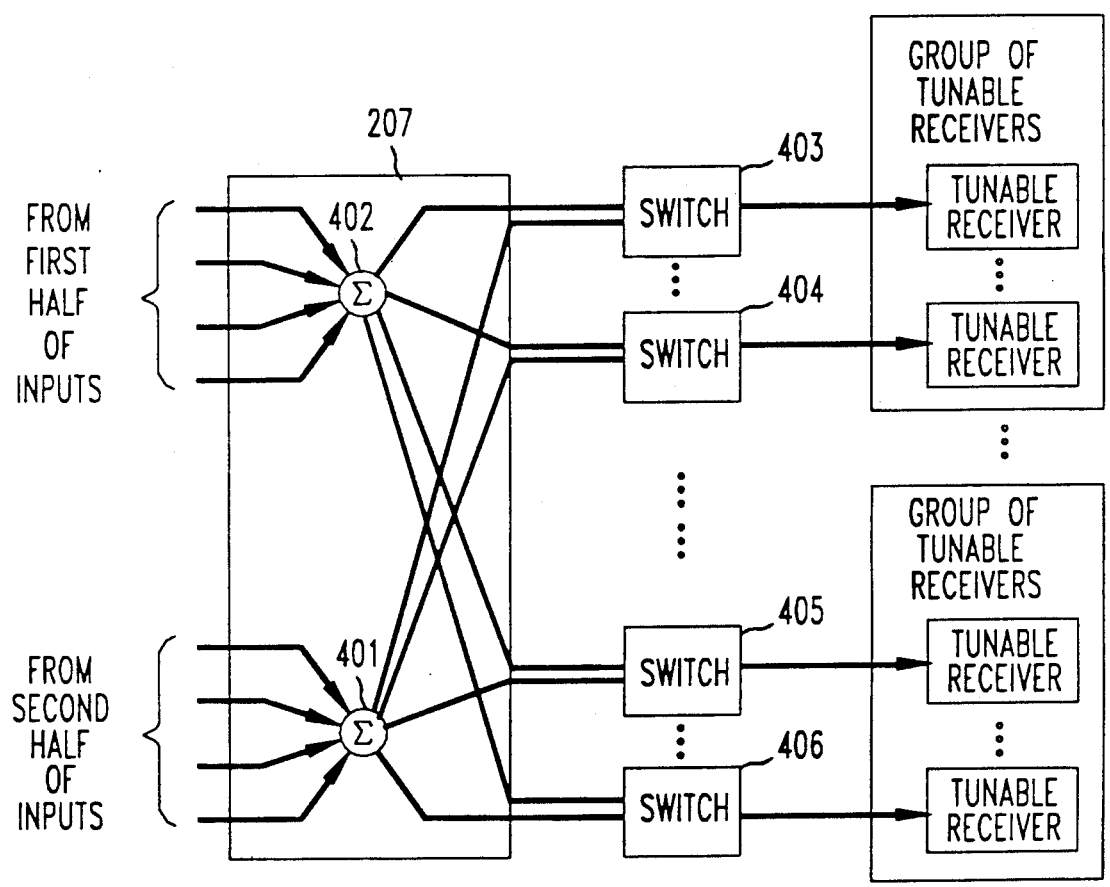
FIG. 4 depicts, in simplified form, details of star network 207 of FIG. 2.

One optional improvement may be realized by implementing star network 207 as a plurality of star couplers, rather than as a single star coupler. FIG. 4 shows an expanded view of star network 207 of FIG. 2. As can be seen from FIG. 4, half of the inputs 235-239 would be routed to star coupler 402, while the remaining half would be routed to star coupler 401. Each tunable receiver would then be coupled to two outputs, one from each of the star couplers 401-402 as shown in FIG. 4. Furthermore, each tunable receiver is preceded by a 2:1 switch, 403-406, which can route the outputs of either star coupler 401 or star coupler 402 to the tunable receiver.

Assuming there were N tunable transmitters 201-206, the first N/2 would utilize one set of N/2 frequencies, and the second N/2 transmitters would use the same set of N/2 frequencies. In each time slot, the two star couplers could operate independently, with no chance of data from one star coupler colliding with data from the other. The arrangement provides the advantage of wavelength reuse, thereby eliminating the need for optical receivers which can receive signals over a wide spectrum of wavelengths. It should also be noted that the concept can be readily extended to any number of star couplers.

While the above description shows the most preferred embodiment, it should be understood that the invention is not limited thereto, and that other modifications may be readily constructed from those of ordinary skill in the art. For example, either heterodyne or homodyne receivers may be employed, and transmission media other than optical may be used. Various group sizes and numbers of groups may be selected, and the table lookup means may be implemented using any of a variety of well known techniques.

We claim:

1. An interconnect fabric comprising:
    a data star network, said data star network including a plurality of inputs for receiving data packets and a plurality of outputs for transmitting the data packets, the outputs being arranged into groups of one or more outputs;
    a plurality of transmitters, each of the transmitters being arranged to receive data packets and to transmit the data packets on a separate channel to a separate input of the data star network;
    a plurality of tunable receivers, each of said tunable receivers being arranged for receiving data packets from a separate data star network output;
    means coupled to each input for determining which group of outputs each arriving data packet is destined for and for generating a request indicative of which group of outputs said arriving data packet is destined for, said means for determining and tuning including a control star network, comprising a plurality of inputs and outputs, a plurality of tunable transmitters, each tunable transmitter coupled to an input of the control star network for transmitting to the control star network requests for the tunable receivers to tune to frequencies determined by addresses contained in arriving packets, and a plurality of receivers each coupled to an output of the controls star network for receiving the requests and for causing up to a predetermined number of said tunable receivers to tune to each predetermined frequency; and
    means coupled to the determining and generating means for receiving the requests and for causing the tunable receivers in each group of outputs to retune in order to receive packets destined for said each group.

2. The interconnect fabric according to claim 1 wherein the transmitters are optical transmitters and the receivers are optical receivers.

3. An interconnect fabric having inputs and outputs comprising
    a data star network including a plurality of inputs and outputs,
    a plurality of fixed data transmitters, each of said data transmitters being arranged on a one-to-one basis to receive incoming data packets from an associated input of the interconnect fabric and being arranged on a one-to-one basis to transmit said received data packets to an input of said data star network;
    a plurality of tunable data receivers, each of said tunable data receivers arranged for receiving data packets on a one-to-one basis from said data star network outputs;
    a control star network including a plurality of inputs and outputs;
    a plurality of tunable transmitters, each of said tunable transmitters being arranged on a one-to-one basis to receive incoming data packets from an associated input of the interconnect fabric and being coupled on a one-to-one basis to an input of said control star network and being adapted for transmitting requests for said tunable receivers to tune to prescribed frequencies; and
    a plurality of receivers each coupled on a one-to-one basis to said control star network outputs and adapted for receiving said requests and for causing up to a predetermined number of said tunable receivers to tune to a requested frequency.

4. The interconnect fabric of claim 3 wherein said transmitters are optical transmitters and said receivers are optical receivers.

* * * * *